United States Patent [19]
Aechter et al.

[11] Patent Number: 5,485,432
[45] Date of Patent: Jan. 16, 1996

[54] METHOD OF MEASURING THE ACOUSTIC BACKSCATTER PROPERTY OF THE FLOOR OF BODIES OF WATER

[75] Inventors: Burckhard Aechter, Achim; Benno Freking, Weyhe-Leeste; Holger Klindt, Rastede, all of Germany

[73] Assignee: STN Atlas Elektronik GmbH, Bremen, Germany

[21] Appl. No.: 361,672

[22] Filed: Dec. 22, 1994

[30]   Foreign Application Priority Data

Dec. 24, 1993 [DE]   Germany ...................... 43 44 509.8

[51] Int. Cl.[6] .......................... G01V 1/38; G01V 13/00; G01S 15/89
[52] U.S. Cl. .................... 367/88; 367/12; 367/13
[58] Field of Search .................. 367/12, 13, 87, 367/88, 103, 92, 119, 131

[56]   References Cited

U.S. PATENT DOCUMENTS

| | | | |
|---|---|---|---|
| 3,144,631 | 8/1964 | Lustig et al. | 367/12 |
| 3,641,484 | 2/1972 | White et al. | 367/12 |
| 4,611,313 | 9/1986 | Ziese | 367/88 |
| 4,939,700 | 7/1990 | Breton | 367/88 |
| 5,033,029 | 7/1991 | Jones | 367/88 |

OTHER PUBLICATIONS

C. de Moustier, "Approaches To Acoustic Backscatter Measurements From The Deep Seafloor" *Marine Physical Laboratory, Scripps Institution of University of Calif. San Diego La Jolla, Calif. Oceanography, Engineering, Am. Soc. of Mech. Eng.*, OED 11, pp. 137–143.

*Primary Examiner*—Ian J. Lobo
*Attorney, Agent, or Firm*—Spencer, Frank & Schneider

[57]   ABSTRACT

A method is provided for measuring the acoustic backscatter property of the floor of a body of water in which an acoustic multibeam echosounder employed on a ship is used to measure the sonic backscattered from a narrow transmission target strip on the sea floor that extends essentially vertically beneath the center of the transmitting antenna, transversely to the travel direction of the ship and which is successively exposed to sonic pulses by the transmitting apparatus. The measured backscatter is converted into sonic backscatter values allocated to receiving strips (115) of the multibeam echosounder. Calibration curves are constructed for all floor elements along the course line of the ship by echosounder measurements during a calibrating operation following a 90° pivot of the echosounder around the vertical axis of the ship. The calibration curves permit an in situ calibration of the sonic backscatter values obtained during the measuring operation, eliminating the influence of the sonic beam angle on the sonic backscatter values so as to result in an unambiguous interpretation of the sonic backscatter values with respect to a definite dependency of local variations in the backscatter measure on changes in the floor sediment.

6 Claims, 4 Drawing Sheets

METHOD OF MEASURING THE ACOUSTIC BACKSCATTER PROPERTY OF THE FLOOR OF BODIES OF WATER

BACKGROUND OF THE INVENTION

This application claims the right of priority with respect to German application No. P 43 44 509.8 filed in Germany on Dec. 24, 1993, the disclosure of which is incorporated herein by reference.

BACKGROUND OF THE INVENTION

The invention relates to a method of measuring the acoustic backscatter property of the floor of a body of water, particularly of the sea floor, employing a fan or multibeam echosounder installed on a ship moving in a traveling direction and including a transmitting and receiving apparatus and a transmitting and a receiving antenna, such a method including: successively exposing a plurality of narrow transmission target strips on the sea floor that extend essentially vertically beneath a center of the transmitting antenna and transversely to the travel direction of the ship to sonic pulses by the transmitting antenna; forming, with the receiving antenna, a fan of narrow receiving strips extending in the travel direction and arranged side-by-side transversely to the travel direction for each transmission target strip, the receiving strips each having a section which covers the associated transmission target strip, of which sections there is a plumb section that lies essentially vertically beneath the center of the receiving antenna; and measuring sonic backscatter from the sections of the receiving strips that cover the transmission target strip respectively exposed to the sonic pulses and forming measured sonic backscatter values from the measured sonic backscatter.

The knowledge of the backscatter property of a floor of a body of water that has been exposed to ultrasonic waves, also called the floor backscatter measure, permits conclusions about the type and state of sediment on the floor, as well as microscale surface structures of the floor. The acoustic backscatter behavior of a real floor of a body of water, however, exhibits a clear dependency on the angle of incidence of the sonic front, and the backscatter coefficient is determined extensively by the angle of the sonic beam against the local surface normal, that is, a line perpendicular to the surface. Therefore, to be able to draw reliable conclusions about the floor sediments, it is necessary to eliminate from the measured receiving energy reflected by the floor upon exposure to sonic energy influences that affect the backscatter coefficients which are not determined by the floor sediment.

In a known method of the type mentioned at the outset, also called "acoustic backscattering measurement," as described, for example, in Moustier de, C., "Approaches to Acoustic Backscatter Measurements From the Deep Seafloor," Marine Physical Laboratory, Scripps Institution of Oceanography, University of California, San Diego, *Symposium on Current Practices and New Technology in Ocean Engineering*, Am. Soc. of Mech. Eng., OED 11, pp. 137–143 (reprinted in *Trans. of the ASME, J., Energy Resources Tech.*, 110, 77–84, 1988), the disclosure of which is incorporated herein by reference, the electrical receiving energies obtained from each segment of the floor exposed to ultrasonic waves are converted into acoustic backscatter energies for consideration of an aspect of these dependencies. This conversion takes into account the changes in angles caused by bending of sonic beams, the geometrical effect of floor gradients transverse to the travel direction and the sonic pulse propagation within a segment exposed to ultrasonic waves such that these influences are eliminated in the so-called "normalized" backscatter measure. In this method, therefore, with respect to the sonic beam angle, only those influences are detected in the measured receiving energies which result from the purely geometrical, diagonal projection of the sonic beam, and also only those caused by the gradient component of the floor in the direction transverse to the travel direction. As already mentioned, however, the backscatter measure is determined by the sonic beam angle against the local surface normal, which is a space vector. A gradient component of the floor in the travel direction leads to a falsification of the backscatter measure. Moreover, the physical dependency of the backscatter measure on the incident angle of the sonic beam is completely ignored. Thus, despite the conversion of the electrical receiving energies, local variations of the floor backscatter measure within a section exposed to ultrasonic waves remain ambiguous and cannot be interpreted because the variations could have been caused by either the angle-dependent component of the backscatter function or by a local change in the type or state of the floor sediment.

SUMMARY OF THE INVENTION

It is therefore an object of the invention to improve a method of the type mentioned at the outset so that the described ambiguity is eliminated, and so that an in situ calibration of the electrical receiving energies and thus of the floor backscatter values is achieved, making local variations in the floor backscatter measure clearly identifiable as changes in the floor sediment.

The above and other objects are achieved in the context of the method of measuring the acoustic backscatter property of a floor of a body of water as first mentioned above, wherein according to the invention the method additionally includes: correcting the first sonic backscatter values of the measuring step by: pivoting, at selected points in time, the transmission target strip and the fan of receiving strips respectively by 90° around the vertical axis of the ship from a measuring position into a calibrating position such that the transmission target strip extends essentially vertically beneath the ship along the longitudinal axis of the ship and the receiving strips extend transversely of the longitudinal axis of the ship; measuring sonic backscatter from individual sections of sea floor successively covered by both the transmission target strips and receiving strips defined in the pivoting step and forming second sonic backscatter values corresponding to the individual sections; constructing a calibration curve for each of said plumb sections of the sea floor during the measuring step covered on the one hand by the receiving strips that lie essentially beneath the longitudinal axis of the ship and on the other hand by successive transmission target strips and during the pivoting step covered by individual receiving strips, in which curve the second sonic backscatter values measured from the plumb section in the individual receiving strips are allocated to the respective receiving strips; and correcting the first sonic backscatter values obtained during the first measuring step with the calibration curves constructed for each plumb section.

Because of the moving of the ship in a travel direction the calibrating operation according to the invention permits the same element of the floor of the body of water to be measured in different receiving strips that have a different position inside the fan, and thus to determine sonic reception from different directional angles. An unknown variable, namely the floor sediment, is thus eliminated. A measured backscatter function is available for each floor point surveyed on the course line of the ship, depending on the individual receiving strips inside the fan, and therefore an angle-dependent backscatter function is produced. If this backscatter function is used in correcting data obtained from the receiving strips in a measuring operation, local variations in the floor backscatter values that still occur afterwards can clearly be interpreted as changes in the type or state of the floor sediment.

In a preferred embodiment of the invention, the backscatter values obtained during a measuring operation are normalized in the same way as described above for the prior art in order to compensate for the falsifying influences of changes in angle caused by beam bending, floor gradients transverse to the travel direction and sonic pulse propagation inside the sections, and for the different sizes of the receiving strips in the fan. In the calibration operation, before the calibration curves are constructed, the measured backscatter values are normalized with the same algorithm, so that the falsifying influences of angle changes due to beam bending, floor gradients (this time in the direction of travel), and sonic pulse propagation in the plumb sections, and differing widths of the receiving strips in the travel direction of the fan are compensated.

The invention is described in detail below by way of an embodiment of a method for measuring the acoustic backscatter property of the sea floor, as illustrated schematically in the drawing figures.

DETAILED DESCRIPTION OF THE PREFERRED EMBODIMENTS

Figure 1:
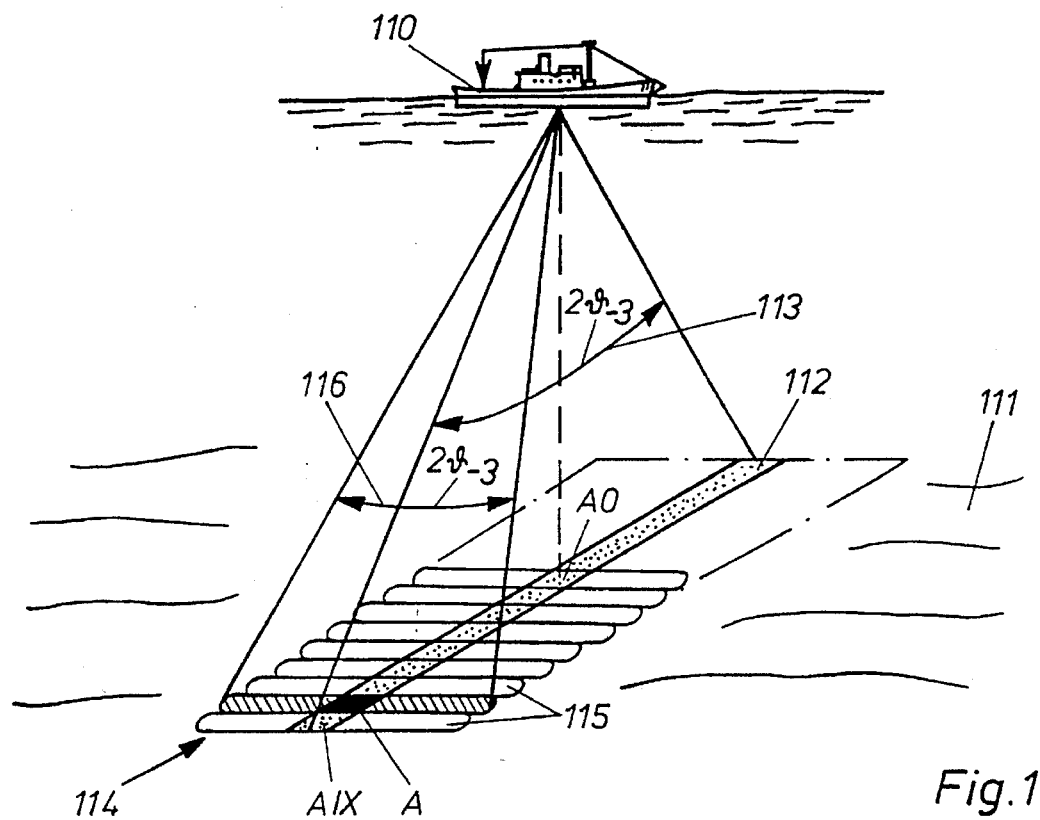
FIGS. 1 and 2 are perspective views of a transmission target strip and a fan of receiving strips created acoustically on the sea floor by a multibeam echosounder from a surveying ship shown, respectively, during a measuring operation and during a calibrating operation.
Figure 2:
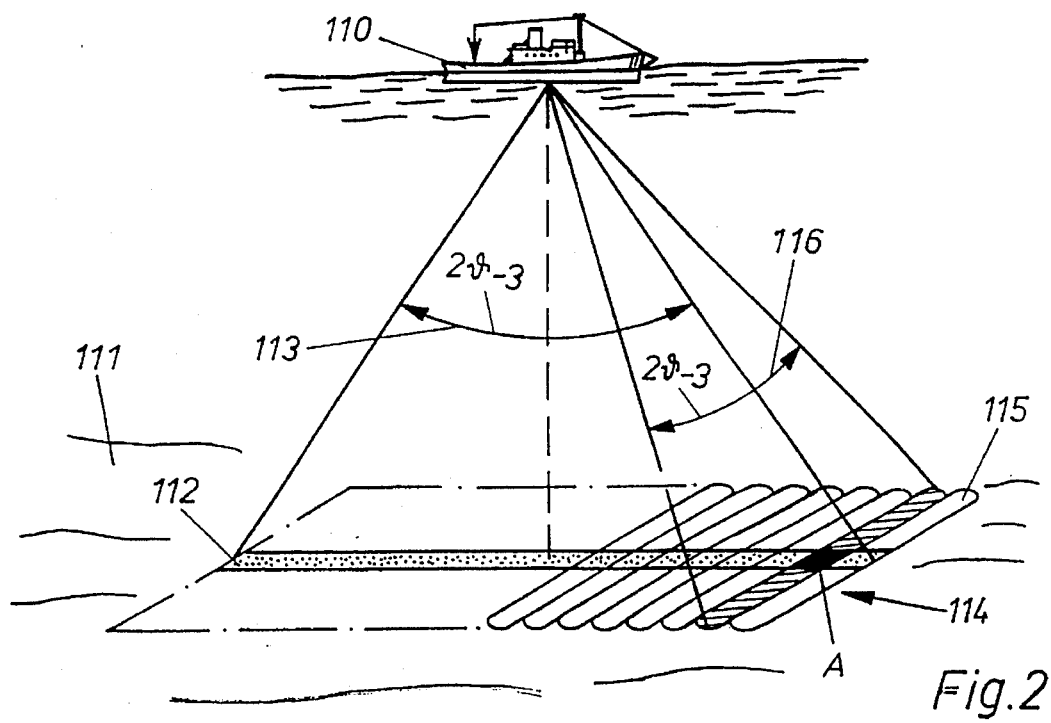

Referring to FIGS. 1 and 2, there is shown a surface ship 110 on which there is installed a multibeam echosounder, which is known per se and which includes a transmitting and receiving apparatus for use in the method of measuring the acoustic backscatter property of the floor of a body of water, such as the sea floor of a sea region, in accordance with the invention. The arrangement and configuration of the transmitting and receiving apparatus, which includes a transmitting and receiving antenna, is represented in the drawings by the transmit and receive patterns, and can be selected to coincide with the apparatus described in U.S. Pat. No. 3,144,631, the disclosure of which is incorporated herein by reference.

The transmitting apparatus is utilized to expose a transmission target strip 112 that lies on sea floor 111 essentially vertically beneath the ship, transversely to the ship's travel direction, that is transversely to the longitudinal axis of the ship which coincides with the travel direction. A sonic transmission beam 113 transmitted by the transmitting antenna is created by of a corresponding configuration of the transmitting antenna, for example a line array and/or through electronic creation of a directional beam, so as to have a beam spread $2\,\theta_{-3}$ in the travel direction of approximately 2° and, transversely to the travel direction of about 60° to 120°. The projection of transmission beam 113 onto sea floor 11 forms a transmission target strip 112.

The sonic energy reflected from transmission target strip 112 on sea floor 111 is received from selected directions by the directional receiving apparatus. Through corresponding electronic signal processing of the individual received signals, the receiving apparatus, provided with a receiving antenna, creates a fan 114 of narrow receiving beams 116 or receiving sectors extending in the travel direction and arranged side-by-side transverse to the travel direction. These beams define receiving strips 115 on sea floor 111, as indicated in FIGS. 1 and 2. In the travel direction, the angle of beam spread $2\,\theta_{-3}$ of receiving beam 116 is approximately 15° and, transversely to the travel direction about 2°. The receiving antenna of the receiving apparatus is disposed relative to the transmitting antenna so that transmission target strip 112 is covered or overlapped by receiving strips 115 of fan 114.

To measure the acoustic backscatter property of sea floor 111 in the region to be surveyed, also referred to as the floor backscatter measure of sea floor 111, sonic pulses are transmitted in a known way via the transmitting antenna of the transmitting apparatus during a measuring operation, and each sonic pulse impacts upon sea floor 111 in transmission target strip 112. Because of the cross arrangement of transmission target strips 112 and receiving strips 115, only one section A in each receiving strip 115 is acoustically "illuminated." Each section A is small in comparison with the corresponding receiving strip 115 projected onto sea floor 111 by receiving beam 116. If all receiving beams 116 have identical angles of beam spread $2\,\theta_{-3}$, the width of receiving strips 115 increases outwardly as the angle of direction of receiving beam 116 in fan 114 increases, although this is not clearly considered in the drawing. As a result, the surfaces of the respective acoustically-illuminated sections A increase, starting from plumb section A0, which lies vertically beneath the longitudinal axis of the ship and extending to section AIX which lies in the outermost receiving strip 115 of fan 114.

The sonic energy backscattered from sea floor 111 in the individual sections A is received separately from the individual receiving strips 115 by the receiving apparatus and outputted as electrical measured values. These electrical measured values are falsified or skewed by different influences caused by real sonic propagation conditions, as well as system variables and constants of the transmitting and receiving apparatus. The electrical measured values are converted into backscatter values by an algorithm which eliminates these falsifying influences. This type of algorithm, discussed theoretically in Moustier de, supra, particularly takes into consideration the angle-dependent transmission energy distribution in the observed solid angle, spherical propagation losses in saltwater, changes in angle due to sonic beam bending, floor gradients transverse to the travel direction, echo integration due to sonic pulse propagation within the individual, illuminated floor sections A, and the system variables and constants of the transmission and receiving apparatus.

Figure 3A:
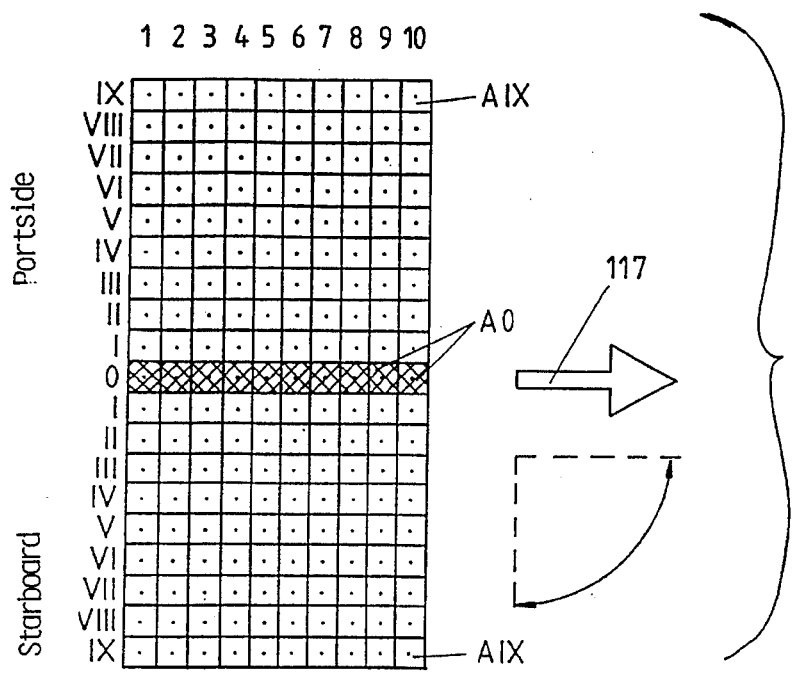
FIGS. 3A and 3B are schematics for explaining the method of the invention, showing the spatial allocation to the individual floor sections of sonic backscatter values obtained at different points in time during travel of the ship, during a measuring operation and a calibration operation, respectively.

The sonic backscatter values obtained in this way are stored so as to be allocated to the individual receiving strips 115 from which they were received, so the spatial allocation of backscatter value and floor element is apparent. This is clarified schematically in FIG. 3A. Here the sections A exposed to sonic waves are illustrated in their spatial allocation. Receiving strips 115 on the starboard and port sides of surveying ship 110 are represented by I through IX. Receiving strip 115 lying vertically beneath the center of the receiving antenna, and therefore along the longitudinal axis of the ship, is represented by 0. The horizontally ordered Arabic numbers at the top of FIG. 3A represent the successive transmission of sonic pulses, during which the surveying ship moves forward in the travel direction of arrow 117. At a traveling speed of surveying ship 110 that is adapted to the frequency of the sonic pulse transmission, a complete area of sea floor 111 is exposed to sonic pulses at a width that corresponds to the width of fan 114.

In the schematic illustrated in FIG. 3A, the surveying ship has moved forward in the travel direction by ten times the width of transmission target strip 112. The backscatter values obtained in the individual sections A after conversion are merely marked by dots in the individual sections A. In actuality, however, the scalar values of sonic backscatter are detected, resulting in a distribution function over the width of fan 114, transversely to the travel direction. Plumb sections A0, emphasized by crosshatching, are covered by receiving strips 115 lying vertically beneath the center of the receiving antenna, and are successively illuminated acoustically.

The distribution function of the backscatter measure of the surveyed sea floor 111 obtained in this manner does not yet permit unambiguous conclusions about the type or state of the floor sediment, because local variations of the backscatter measure can be caused either by a change in the floor sediment or the physical angle dependency of the backscatter measure, or by changes in the floor gradient in the travel direction. In the above-mentioned algorithm for converting the electrical measured variables outputted after reception of the backscattered sonic energies, the dependency on the incident angle of the sonic front is only compensated relative to the sonic beam angle against the surface normal in the plane transverse to the travel direction on each floor element covered by section A. The backscatter coefficients of the floor elements exposed to ultrasonic waves inside sections A are, however, determined by the surface normal of the floor element, which is a spatial vector, and thus has a vector component in the plane transverse to the travel direction, which is determined in the algorithm, and another vector component in the plane parallel to the travel direction, which is not determined in the algorithm. To eliminate the ambiguity caused by this and by the physical dependency of the backscatter measure on the sonic beam angle, a calibration operation is initiated in addition to the measuring operation, in which calibration curves are constructed from suitable measurements to permit an in situ calibration of the distribution function of the sonic backscatter values obtained during the measuring operation.

Figure 3B:
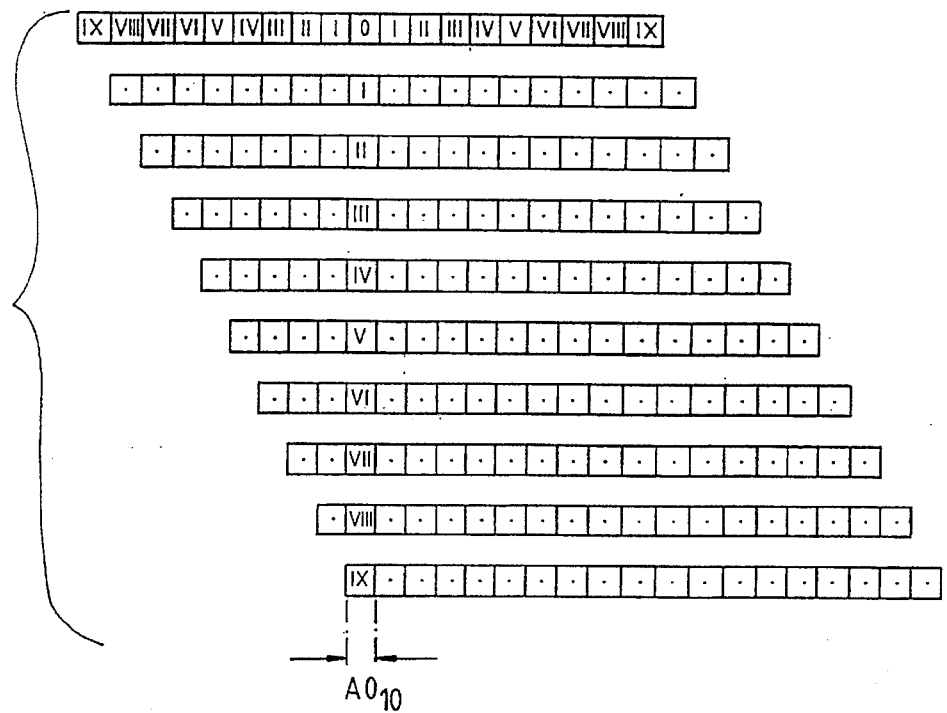
Figure 4:
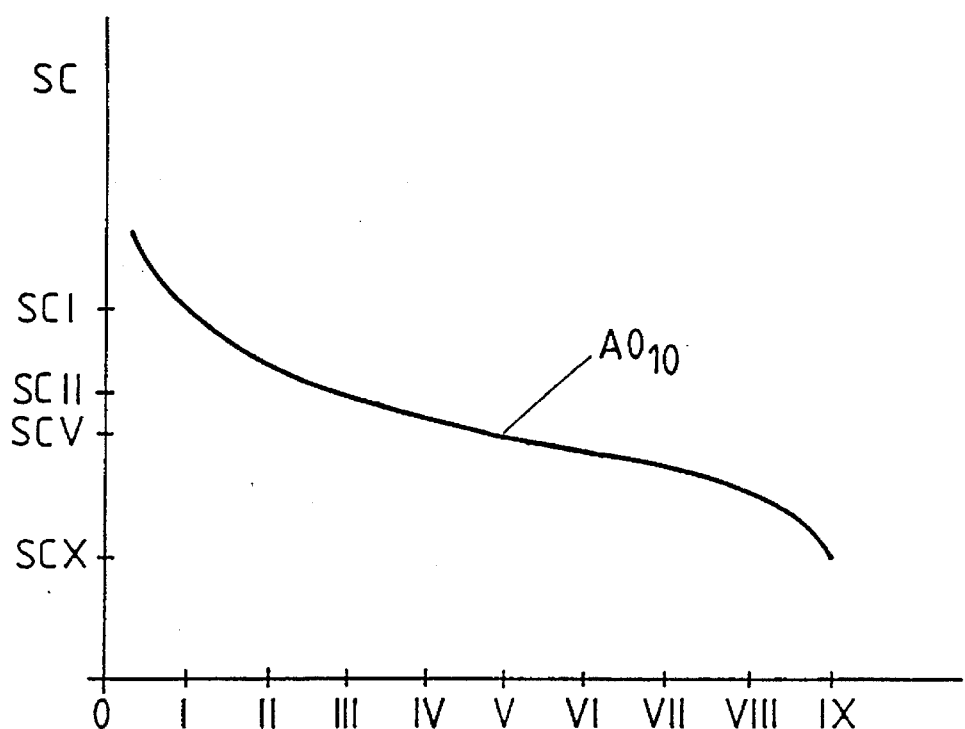
FIG. 4 is a calibration curve constructed for a plumb section during a measuring operation.

If surveying ship 110 has covered a distance in travel direction 117 during a measuring operation, a number of transmission target strips 112, represented by arabic numbers 1 through 10 in FIG. 3A, are acoustically illuminated successively by the transmitting apparatus. The sonic energy backscattered from sections A, where receiving strips 115 overlap the transmission target strips 112, is measured and the electrical measured values are converted into backscatter values. At a point in time that can be freely selected, and is defined in detail below, the transmitting and receiving apparatus is switched over to calibration mode, i.e. transmission beam 113 and fan 114 of receiving beams 116 are pivoted together by 90° around the vertical axis of the ship out of their measuring position illustrated in FIG. 1 into a calibration position shown in FIG. 2. This pivoting is preferably effected by switching a relay matrix which is disposed between the transmitting and receiving antennas and the transmitting and receiving apparatuses, which separates the individual antenna converters from the respectively associated apparatus and connects the converters to the respective other apparatus. This presupposes an identical geometrical configuration of the transmitting and receiving antenna. In individual cases, however, pivoting can also be effected by common mechanical rotation of the transmitting and receiving antenna. Transmission target strip 112 and receiving strips 115 of fan 114 thus assume the position shown schematically in FIG. 2. Transmission target strip 112 is now vertically beneath the longitudinal axis of the ship, and receiving strips 115 are oriented transversely to travel direction 117 of surveying ship 110, disposed side-by-side in travel direction 117. In the calibration position, transmission target strip 112 exactly covers that portion of the survey area in which plumb sections A0 are defined. The sonic energy that is backscattered from the individual plumb sections A0 under the longitudinal axis of the ship is measured and converted, with the described algorithm, in the same way as in the measuring operation to form backscatter values from plumb sections A0. If the multibeam echosounder is used constantly over a series of sonic cycles during the calibration operation, in an ideal, straight course line, each plumb section A0 is covered by all receiving strips 115, and thus each floor element of a row of receiving beams 116 defined by a plumb section A0 is measured with different angle orientations. This is illustrated in the FIG. 3B by way of example for plumb section $A0_{10}$, which is designated by the number 10 in transmission target strip 112 in FIG. 3A. In the pivoted fan 114 of FIG. 3B, the representation of receiving strips 115, now adjacent in travel direction 117, by Roman numerals I through IX and 0 is retained. The sonic energy backscattered from plumb section $A0_{10}$ during exposure to a transmitted sonic pulse is first received in the receiving apparatus from the perpendicular receiving strips 115 indicated by 0, in the next sonic cycle in receiving strip I, subsequently in receiving strips II, III, etc., and finally in receiving strip IX. Hence, the backscattered sonic energy from the floor element defined by plumb section $A0_{10}$ is measured at ten different directional angles, and the electrical measured variables are converted into backscatter values with the aid of the described algorithm. The backscatter values allocated to the individual receiving strips 0, I through IX construct the so-called calibration curve, as illustrated by way of example in FIG. 4. This type of calibration curve is constructed for each plumb section A0, that is, for each plumb section $A0_0$ through $A0_{10}$ shown in FIG. 3A.

The backscatter values of the sea floor 111 obtained during the measuring operation and allocated to the individual receiving strips 115 are now corrected with the calibration curves. One calibration curve is applicable to all backscatter values obtained within the same transmission target strip 112 in the measuring operation. Theoretically, the calibration curve illustrated for plumb section $A0_{10}$ in FIG. 4 would be used solely for calibrating the measured values obtained in the sonic cycle indicated by 10 in the same transmission target strip 112 of FIG. 3A. Correspondingly, a calibration curve constructed in the same manner for plumb section $A0_9$ would be valid for all of the backscatter values obtained by exposure to sonic waves in transmission target strip 112, which is indicated by 9 in FIG. 3. In practice, however, course variations of surveying ship 110 cause deviations from the ideal course line. Therefore, the described unambiguous allocation is difficult, and information about the calibration curves is necessary for a plurality of or all of plumb sections A0. This information is then applied to the measured values from a number of transmission target strips 112. Calibration is carried out so that the backscattered values allocated to the individual receiving strips 0 and I through IX are corrected with the calibration values contained in the individual calibration curves allocated to receiving strips 0, I through IX, or in the averaged (mean) calibration curve.

Figure 5:
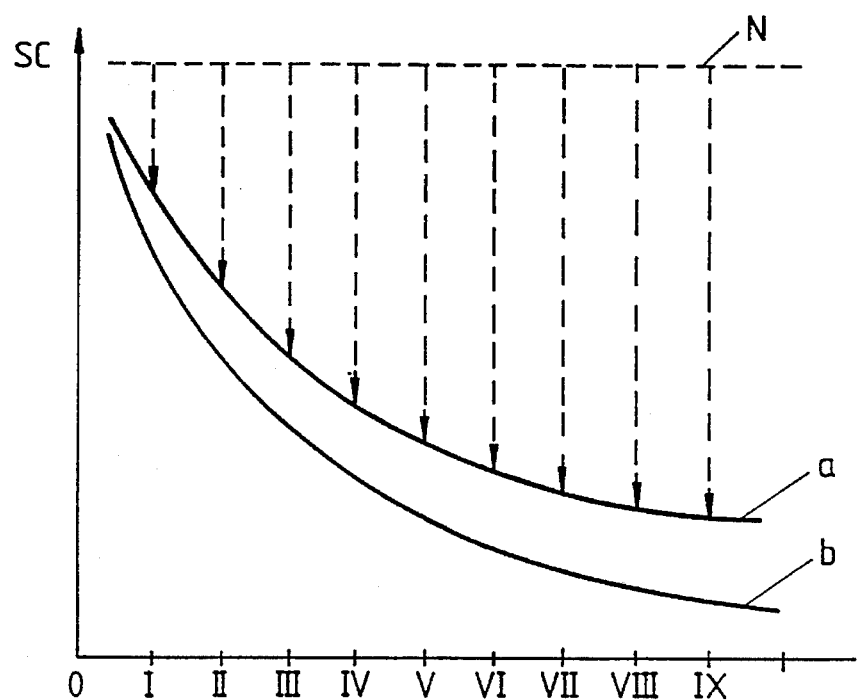
FIG. 5 is a graph representing a measurement curve and a calibration curve formed in accordance with the method of the invention.
Figure 6:
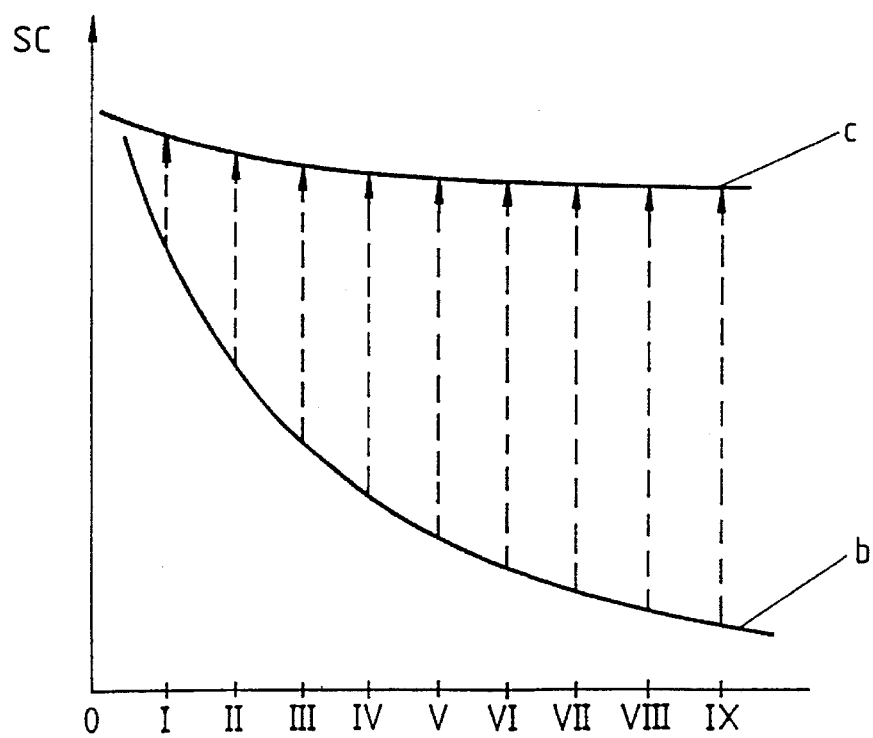
FIG. 6 shows the calibration curve of FIG. 5 and additionally a calibrated measurement curve in accordance with the method of the invention.

The calibration procedure is explained in FIGS. 5 and 6. In FIG. 5, curve "a" represents an example of an averaged (mean) calibration curve. Curve "b" shows an example of a measurement curve on the port side or the starboard side of surveying ship 110. As in FIG. 4, the backscatter measurement SC is plotted with respect to receiving strips 0 and I–IX of fan 114. In FIG. 6 there is shown the same measurement curve "b" as shown in FIG. 5 together with a calibrated measurement curve "c". For calibration to be performed, the difference between the calibration value on the calibration curve "a" and an arbitrary defined straight reference line N, preferably plotted parallel to the abscissa, is determined for each receiving strip 0, I–IX (FIG. 5), and this difference is added to the measured value of measurement curve "b" in the corresponding receiving strip 0, I–IX (FIG. 6). The result is the calibrated measurement curve "c" shown in FIG. 6. In addition to the physical angle dependency of the backscatter measurement, any change caused by a gradient of the floor elements in the travel direction is compensated in the calibrated distribution function of the floor backscatter measurement because of this calibration. Each local change in the floor backscatter measurement still occurring in the calibrated distribution function is therefore only as a result of a change in the type of floor sediment, and is thus unambiguous.

In order for surveying ship 110 to be able to execute a constant surveying path, and for the entire sea floor 111 under the fan width to be measured without gaps during a measuring operation, the fan depth finder is alternatingly operated in measuring and calibrating operations. In this way, for example, during every other sonic pulse transmission of the transmission beam 113 the fan depth finder is pivoted from its measurement position into its calibration position. An overlap of the survey region by the fan depth finder is obtained such that the described measuring and calibrating operations can be performed without gaps and losses of precision when surveying ship 110 travels a constant path. Of course, it is also possible to transmit a plurality of consecutive sonic pulses during a measuring operation, and only afterward initiate a calibrating operation. However, here a limit/boundary exists at which certain gaps must be accepted in the measuring operation, and significant imprecisions must be accepted in the calibrating operation.

In accordance with a further aspect of the method of the invention, the sonic backscatter values obtained during the measuring operation and during the calibrating operation are preferably normalized, in the manner previously discussed, prior to construction of the calibration curves and execution of the correction of the sonic backscatter values of the measuring operation, so that falsifying influences of changes in angles caused by bending of sonic beams, floor gradients, sonic pulse propagation within the sections and different sizes of receiving strips in the fan, are compensated.

Further, in accordance with the inventive method, the respective positions of the receiving strips inside the fan are determined from the directional angle of receiving beams generated in the receiving apparatus by signal processing. Desirably, the receiving beams each have the same angle of beam spread and the angle of beam spread has orthogonal angle components, with one orthogonal component $2\theta_{-3}$ a multiple of the other, as shown in FIGS. 1 and 2.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A method of measuring an acoustic backscatter property of a floor of a body of water, with the use a ship having vertical and longitudinal axes and moving in a travel direction, wherein a multibeam echosounder is installed on the ship and includes a transmitting and receiving apparatus and a transmitting antenna and a receiving antenna, said a method including:

(a) successively exposing a plurality of narrow transmission target strips on the sea floor that extend essentially vertically beneath a center of the transmitting antenna and transversely to the travel direction of the ship to sonic pulses by the transmitting antenna;

(b) forming, with the receiving antenna, a fan of narrow receiving strips extending in the travel direction and arranged side-by-side transversely to the travel direction for each transmission target strip, the receiving strips each having a section which covers the associated transmission target strip, of which sections there is a plumb section that lies essentially vertically beneath the center of the receiving antenna;

(c) measuring sonic backscatter from the sections of the receiving strips that cover the transmission target strips respectively exposed to a sonic pulse and forming first sonic backscatter values from the measured sonic backscatter;

(d) correcting the first sonic backscatter values of said measuring step by:

(d)(1) pivoting, at selected points in time, the transmission target strip and the fan of receiving strips respectively by 90° around the vertical axis of the ship from a measuring position into a calibrating position such that the transmission target strip extends essentially vertically beneath the ship along the longitudinal axis of the ship and the receiving strips extend transversely of the longitudinal axis of the ship;

(d)(2) measuring sonic backscatter from individual sections of sea floor successively covered by both the transmission target strips and receiving strips defined in said pivoting step and forming second sonic backscatter values corresponding to the individual sections;

(d) (3) constructing a calibration curve for each of said plumb sections of the sea floor defined in said measuring step (b) and covered by individual receiving strips during said pivoting step, in which curve the second sonic backscatter values measured from the plumb section in the individual receiving strips are allocated to the respective receiving strips; and (d) (4) correcting the first sonic backscatter values obtained during said measuring step (c) with the calibration curves constructed for each plumb section.

2. A method as defined in claim 1, wherein said correcting step includes averaging the calibration curves constructed for a plurality of plumb sections to form a mean calibration curve and using the mean calibration curve to correct the first sonic backscatter values obtained during said measuring step (c).

3. A method as defined in claim 1, wherein said correcting step includes detecting, for each receiving strip in the calibration curve, a difference value between a straight reference line and the calibration curve; and adding the difference value to first sonic backscatter values for that receiving strip obtained during measuring operation.

4. A method as defined in claim 1, and further including normalizing the first and second sonic backscatter values prior to construction of the calibration curves and execution of the correcting step so that falsifying influences of changes in angles caused by bending of sonic beams, floor gradients, sonic pulse propagation within the sections and different sizes of receiving strips in the fan, are compensated.

5. A method as defined in claim 1, further including determining respective positions of receiving strips inside the fan from a directional angle of receiving beams generated in the receiving apparatus by signal processing.

6. A method as defined in claim 5, wherein the receiving beams each have the same angle of beam spread, and the angle of beam spread has orthogonal angle components and one of said angle components is a multiple of the other of said angle components.

* * * * *